United States Patent
Mennen et al.

(10) Patent No.: US 10,315,925 B2
(45) Date of Patent: Jun. 11, 2019

(54) METHOD AND PLANT FOR PRODUCING UREA-AMMONIUM NITRATE (UAN)

(71) Applicant: Stamicarbon B.V., Sittard (NL)

(72) Inventors: Johannes Henricus Mennen, Sittard (NL); Fredericus Henricus Maria Buitink, Sittard (NL); Willem Frederik Roos, Sittard (NL)

(73) Assignee: Stamicarbon B.V., Sittard (NL)

( * ) Notice: Subject to any disclaimer, the term of this patent is extended or adjusted under 35 U.S.C. 154(b) by 149 days.

(21) Appl. No.: 15/528,708

(22) PCT Filed: Nov. 26, 2015

(86) PCT No.: PCT/NL2015/050830
§ 371 (c)(1),
(2) Date: May 22, 2017

(87) PCT Pub. No.: WO2016/085343
PCT Pub. Date: Jun. 2, 2016

(65) Prior Publication Data
US 2017/0260061 A1 Sep. 14, 2017

(30) Foreign Application Priority Data
Nov. 27, 2014 (EP) .................................. 14195198

(51) Int. Cl.
*C01C 1/18* (2006.01)
*C05C 1/00* (2006.01)
(Continued)

(52) U.S. Cl.
CPC ............. *C01C 1/185* (2013.01); *B01J 10/007* (2013.01); *B01J 19/00* (2013.01); *B01J 19/002* (2013.01);
(Continued)

(58) Field of Classification Search
None
See application file for complete search history.

(56) References Cited

U.S. PATENT DOCUMENTS 3,746,528 A 7/1973 Johnson
3,985,523 A * 10/1976 Kaupas .................. B01D 53/54
  95/193

(Continued)

FOREIGN PATENT DOCUMENTS

| FR | 2 389 601 | 12/1978 |
| WO | WO-2008/068210 | 6/2008 |
| WO | WO-2013/165246 | 11/2013 |

OTHER PUBLICATIONS

Communication under Rule 71(3) EPC for EP 15 832 900.3, dated Jul. 23, 2018, 28 pages.

*Primary Examiner* — Wayne A Langel
(74) *Attorney, Agent, or Firm* — Morrison & Foerster LLP

(57) ABSTRACT

The invention provides a method and a plant for producing urea ammonium nitrate (UAN). The method involves the use of a condensation section, optionally in combination with a medium pressure decomposition section, between the dissociation and neutralization sections. The invention further provides a method of modifying an existing UAN plant. The advantages of the process of the invention are that the emission of $CO_2$ can be reduced, the plant capacity can be increased and the high capital expenditure needed for $CO_2$ compression equipment is reduced.

12 Claims, 3 Drawing Sheets

Figure 1:
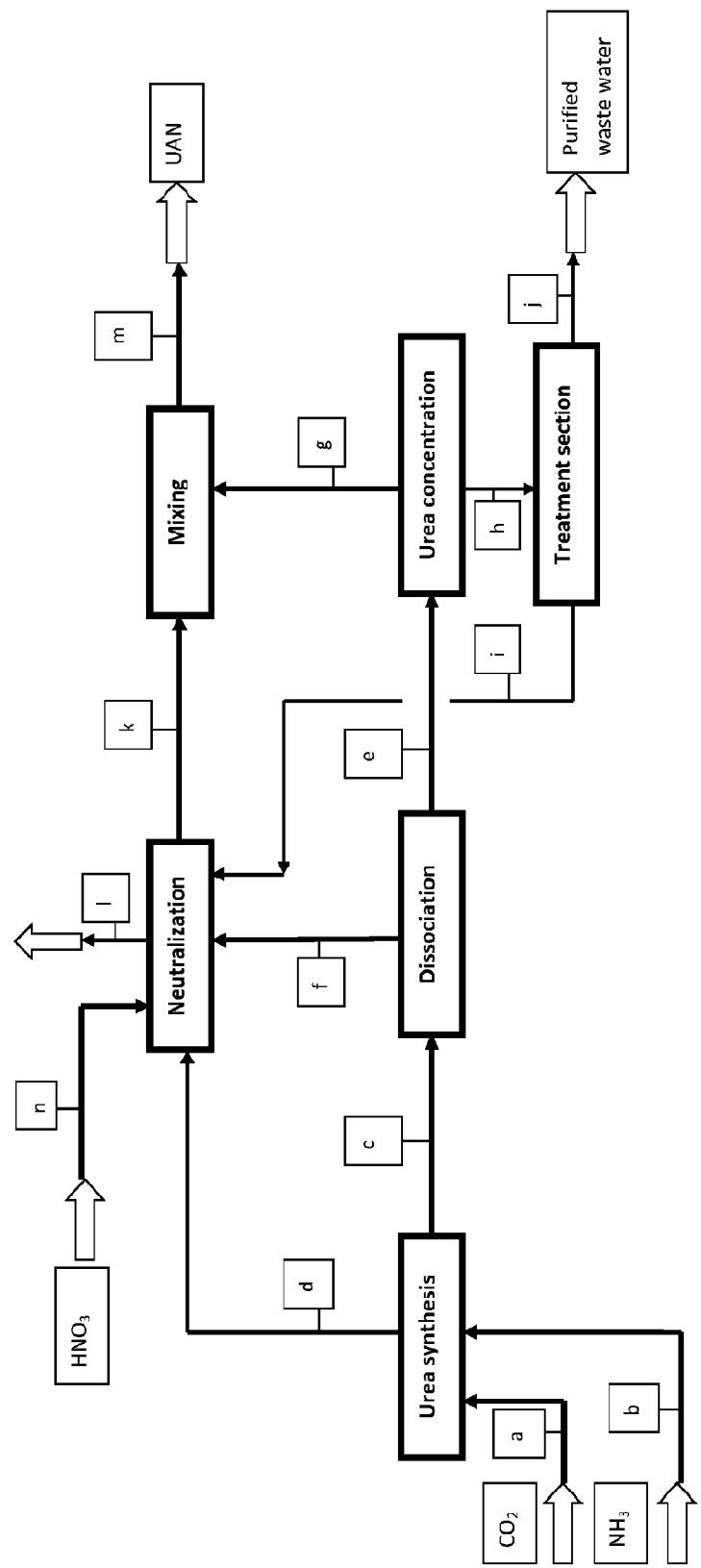

(51) Int. Cl.
  *C05C 9/00* (2006.01)
  *B01J 19/00* (2006.01)
  *B01J 10/00* (2006.01)

(52) U.S. Cl.
  CPC .............. *C05C 1/00* (2013.01); *C05C 9/00* (2013.01); *B01J 2219/0004* (2013.01); *B01J 2219/00024* (2013.01)

(56) References Cited

U.S. PATENT DOCUMENTS

| | | | | |
|---|---|---|---|---|
| 4,086,271 A | * | 4/1978 | Mavrovic | C07C 273/04 564/67 |
| 4,174,379 A | * | 11/1979 | Froehlich | C01C 1/185 422/609 |
| 4,208,347 A | | 6/1980 | Pagani | |
| 4,231,839 A | * | 11/1980 | Barron | B01D 3/00 159/17.1 |
| 4,801,746 A | * | 1/1989 | Baenens | C07C 273/04 564/67 |
| 6,730,811 B1 | * | 5/2004 | Mennen | C07C 273/04 422/648 |
| 8,293,201 B2 | * | 10/2012 | Casara | B01D 53/58 422/129 |
| 2004/0054229 A1 | * | 3/2004 | Meessen | C07C 273/04 564/67 |
| 2008/0092614 A1 | * | 4/2008 | Ingels | B01J 19/242 71/30 |
| 2011/0229394 A1 | * | 9/2011 | Niehues | C05C 3/005 423/238 |
| 2012/0258034 A1 | * | 10/2012 | Hilbig | A61K 33/00 423/405 |

* cited by examiner

METHOD AND PLANT FOR PRODUCING UREA-AMMONIUM NITRATE (UAN)

CROSS-REFERENCE TO RELATED APPLICATIONS

This application is the national phase of PCT application PCT/NL2015/050830 having an international filing date of 26 Nov. 2015, which claims benefit of European patent application No. 14195198.8 filed 27 Nov. 2014. The contents of the above patent applications are incorporated by reference herein in their entirety.

The invention relates to the area of urea comprising fertilizers, particularly urea-ammonium nitrate (UAN) fertilizers. The present invention provides a method and a plant for producing UAN fertilizer as well as a method for modifying an existing UAN plant.

Urea-ammonium nitrate (UAN) is a solution of urea and ammonium nitrate in water used as a fertilizer. The most commonly used grade of these fertilizer solutions is UAN 32.0.0 (32% N), which consists of 45 wt. % ammonium nitrate, 35 wt. % urea and 20 wt. % water. Other grades are UAN 28, UAN 30 and UAN 18.

Methods and plants for the production of UAN are known in the art. In some processes ammonium nitrate and urea are mixed in the desired ratio to obtain the UAN composition. Such processes are performed off site from a urea production facility.

In other methods, UAN production is incorporated in a urea plant. In a typical method, a urea synthesis solution is produced in a high pressure urea synthesis section comprising a urea reactor, a stripper and a condenser. Said urea synthesis solution is then subjected to dissociation in a low pressure dissociation section and subsequent concentration in a urea concentration section to produce a concentrated urea solution. The gases ($CO_2$ and $NH_3$) evolving from the urea synthesis section and the dissociation section are sent to a neutralization section where they are brought into contact with an acid, typically nitric acid, to form an ammonium nitrate salt solution. Said ammonium nitrate salt solution and said concentrated urea solution are then mixed together in the required concentration ratio to obtain a liquid UAN product stream.

A disadvantage of the above mentioned process is that significant amounts of $CO_2$ are emitted to the atmosphere. This emitted $CO_2$ represents a loss of raw material, which needs to be replaced by fresh $CO_2$ to the $CO_2$ compressor. In addition, $CO_2$ is considered to contribute to global warming and its emission to the atmosphere should therefore be restricted or avoided.

The present invention aims to reduce or eliminate the above mentioned drawbacks.

In one aspect, the present invention provides a method for producing UAN, the method comprising:

a) reacting $CO_2$ and ammonia under urea forming conditions in a high pressure urea synthesis section to produce a first urea solution comprising urea, water, ammonium carbamate and a first gas stream, b) subjecting said first urea solution to dissociation in a dissociation section thereby decomposing ammonium carbamate into a second gas stream and a second urea solution, c) subjecting the second urea solution obtained under b) to one or more concentration steps to produce a concentrated third urea solution, d) subjecting the first gas stream obtained under a) to partial condensation in at least one condensation section to form a liquid stream comprising ammonium carbamate and a third gas stream, e) recycling the liquid ammonium carbamate comprising stream to the high pressure urea synthesis section, f) subjecting the third gas stream, optionally together with fresh ammonia, to neutralization with nitric acid in a neutralization section to produce an aqueous stream comprising ammonium nitrate, and g) combining said aqueous stream comprising ammonium nitrate produced under f) and said concentrated third urea solution produced under c) to produce UAN.

In another aspect, the present invention provides a plant for the production of urea ammonium nitrate (UAN), comprising a urea synthesis section, a dissociation section and a urea concentration section in fluid communication with each other, and a neutralization and a mixing section for the production of UAN, further comprising a medium pressure treatment section upstream of the dissociation section, said medium pressure treatment section comprising a decomposer and a condensation section, wherein the decomposer is in fluid communication with the condensation section so that the gases from the decomposer and optionally the dissociation section are sent to the condensation section, wherein the condensation section is in fluid communication with the urea synthesis section so that the carbamate solution formed in the condensation section is recycled to the urea synthesis section and the gases from the urea synthesis section are supplied to the condensation section, and wherein the condensation section is in fluid communication with the neutralization section so that the uncondensed gases are sent to the neutralization section to be reacted with nitric acid to form ammonium nitrate.

In yet a further aspect, the present invention provides a method of modifying an existing UAN plant, the method comprising providing a UAN plant comprising a urea synthesis section, a dissociation section and a urea concentration section in fluid communication with each other, and a neutralization and mixing section to produce UAN, wherein the UAN plant is modified by adding a medium pressure treatment section comprising a decomposer and a condensation section between the synthesis section and the dissociation section, wherein the gases from the decomposer and the synthesis section, are sent to one or more condensation sections where they are partially condensed to form a carbamate solution which is recycled to the urea synthesis section and wherein the remaining gases are sent to the neutralization section and reacted with nitric acid to form ammonium nitrate.

The present invention particularly makes use of at least one condensation section between the dissociation and the neutralization sections. The condensation sections can operate at different pressures, which will be discussed in more detail herein-below. It is also possible that several condensation sections are used operating at different pressures, e.g. a medium and a low pressure condensation sections.

The invention is based on the judicial insight that by partially condensing the ammonia and carbon dioxide evolving from the urea solution as it is being increased in concentration and recycling the resulting carbamate solution back the synthesis section that the energy consumption of the process is reduced, the urea production capacity is increased and the carbon dioxide emissions are reduced.

Partial condensation means here that only a part of the ammonia and $CO_2$ present in the gas stream supplied to the condensation section is condensed, no full condensation takes place. Preferably, partially means that at least 80 wt. % of the ammonia and/or $CO_2$ is condensed, more preferably at least 90 wt. %.

In more detail, in step a) of the method according to the present invention, carbon dioxide and ammonia are reacted under urea forming conditions in a high pressure urea synthesis section to form a liquid stream being a first urea solution and a first gas stream. For that, some feedstock ammonia and carbon dioxide are used, which are compressed to the pressures required during the synthesis.

Preferably, the $CO_2$ feed is subjected to a treatment to remove hydrogen from it, which can be done by catalytic conversion. Hydrogen is often present in the $CO_2$ feed and since it does not take part in the present processes, it is eventually present in the off-gases. In existing methods the hydrogen removal from the $CO_2$ feed would usually not be necessary since the vented vapor (particularly from the neutralizing section) comprises large amounts of $CO_2$ keeping the vented vapor outside the flammability range. The present invention however reduces the amount of $CO_2$ to be vented and in such case it is preferred from safety point of view to remove hydrogen in the carbon dioxide feed.

The first urea solution, usually called urea synthesis solution, typically comprises urea, water and ammonium carbamate. The first gas stream typically comprises inerts, water, ammonia and carbon dioxide. The urea forming conditions are known to a skilled person. The first gas stream is preferably the gas stream leaving the urea reactor. Optionally, this gas stream also comprises the gases leaving the high pressure carbamate condenser, if present in a urea synthesis section.

The first urea solution from the synthesis section is subjected to dissociation in a dissociation section in step (b). In the dissociation section, ammonium carbamate contained in the urea solution is decomposed, which leads to the formation of a second gas stream, typically comprising water, ammonia and $CO_2$, and a second urea solution. This second urea solution is subjected to evaporation to obtain a urea solution that is substantially free of ammonia and $CO_2$. Substantially free means here that the solution contains less than 1 wt. % ammonia and less than 0.5 wt. % $CO_2$. The dissociation section operates at low pressures, typically 2-10 bar, preferably 2-6 bar, for example 4 bar.

The second urea solution obtained in the dissociation section is subjected to one or more concentration steps in step c) to produce a concentrated third urea solution. The concentrated urea solution typically comprises at least 50 wt. % urea. A highly concentrated urea solution with a urea concentration of at least 95 wt. % is usually called urea melt.

The first gas stream obtained in steps a) is subjected in step d) to partial condensation in at least one condensation section. The operating pressure of the condensation section can be high pressure similar to the pressure in the synthesis section, or the pressure in the dissociation section, or any pressure in between. Also several condensation sections operating at different pressures can be used, for example, the carbamate solution obtained in a low pressure condensation section can be increased in pressure and sent to a medium pressure condensation section or to a high pressure condensation section with the same or similar pressure as in the high pressure synthesis reactor.

As a result of the partial condensation, a liquid stream comprising ammonium carbamate and a third gas stream being an uncondensed gas stream comprising ammonia are formed. The third gas stream comprises predominantly ammonia. Particularly, it preferably contains at least 60 wt. %, preferably, at least 80 wt. %, more preferably at least 90 wt. % of ammonia. In a special embodiment of step (d), also the second gas stream is subjected to partial condensation in the at least one condensation section. In that case both the first and the second gas streams are subjected to condensation in the condensation section. While being optional, the condensation of the second gas stream in the condensation section is particularly useful when the first urea solution is directly sent to the dissociation section.

In step (e), the liquid stream comprising ammonium carbamate is recycled to the high pressure urea synthesis reaction section. Since this liquid stream is produced at a typically lower pressure than the pressure in the urea synthesis section, the pressure of the carbamate comprising stream should in practice be increased.

The third gas stream which is the uncondensed ammonia comprising stream, is subjected in step f), optionally together with fresh ammonia, to neutralization with nitric acid in a neutralization section to produce an aqueous stream comprising ammonium nitrate. By contacting the off-gases of the urea plant, comprising among other components ammonia, with nitric acid, ammonium nitrate is formed according the following equation:

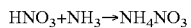

$$HNO_3 + NH_3 \rightarrow NH_4NO_3$$

The neutralization section operates at low pressures similar to those in the dissociation section or even lower, such as at atmospheric pressure. Preferably, the neutralization section is operated between atmospheric and 10 bar, and typically between 10 mm water column and 5 bar absolute. Among others the neutralization section type can comprise a pipe reactor, a siphon type or draft tube type reactor. The off-gas leaving the neutralizer would typically comprise inerts and minor amounts of carbon dioxide and can be sent after gaseous purification treatments into the atmosphere.

The obtained ammonia nitrate aqueous stream is combined in step g) with the concentrated third urea solution produced under c) to produce UAN. The streams are combined in a suitable ratio required by the desired composition.

In one embodiment, the high pressure urea synthesis section comprises a high pressure urea reactor, a high pressure stripper and a high pressure carbamate condenser. Typically, the urea solution from the urea reactor is sent to the stripper, where it is contacted under heating with a strip gas, for example carbon dioxide, so that the carbamate in the urea solution is decomposed. Alternatively ammonia may be used as the strip gas or only heating may be used, which is often referred to as a 'self stripping' process. The heat, required for this purpose, can be supplied by passing steam around the tubes of said high pressure stripper.

The off-gases from the high pressure stripper comprising carbon dioxide and ammonia are sent, typically together with feedstock ammonia, to the high pressure condenser, where they are partially condensed. The remaining uncondensed gases (first gas stream) are sent to the condensation section, optionally via the reactor where the supplied gases comprising ammonia and $CO_2$ condense to use the released condensation heat for the endothermic urea reaction. The high pressure carbamate condenser in the synthesis section can be a kettle type, a falling film type or a submerged type condenser. The submerged condenser may be installed vertically or horizontally. A horizontal type submerged heat exchanger is described in Ullmann's Encyclopedia of Industrial Chemistry, Vol. A27, 1996, pp 333-350. In the high pressure carbamate condenser the exothermic carbamate reaction takes place and usually the released heat of condensation is used to produce steam that is used as a heating agent in the downstream processing of the urea plant. The formed carbamate, comprising also some urea and the non-condensed vapour are sent from this condenser to the urea synthesis reactor where the endothermic conversion of carbamate into urea takes place to almost its equilibrium. A submerged condenser provides a substantial residence time leading to a significant production of urea. The reactor effluent flows to the high pressure stripper.

The first urea solution from the stripper is sent to the dissociation section. The second gas stream formed in the dissociation section can be sent directly to the neutralization section, or, alternatively, this gas stream can be sent to a condensation section wherein the second gas stream together with the first gas stream is partially condensed at a pressure similar to the pressure in the dissociation section. Several condensation sections operating at different pressures can be used, for example, the carbamate solution obtained in a low pressure condensation section can be increased in pressure and sent to a medium pressure condensation section or to a high pressure condensation section with the same or similar pressure as in the high pressure synthesis reactor.

In another embodiment, a medium pressure section is present between the urea synthesis section and the dissociation section. In this embodiment, the first urea synthesis solution from the synthesis section is sent to the medium pressure treatment section, before being sent to the dissociation section. This medium pressure treatment section comprises a decomposer (such as an adiabatic flash) and operates at medium pressures, typically in the range 10-50 bar, preferably 15-30 bar, for example around 20 bar. The urea reaction solution is subjected to decomposition at medium pressure and is separated into a medium pressure liquid stream and a medium pressure gas stream. The liquid stream is a more concentrated liquid stream comprising urea, water and ammonium carbamate, while the gas stream typically comprises ammonia, $CO_2$ and water. The medium pressure liquid stream is further supplied to the dissociation section, while the medium pressure gas stream is sent to a condensation section to be partially condensed together with the first gas stream from the urea synthesis section (and optionally other streams) and recycled to the urea synthesis section. The uncondensed gases are sent to the neutralization section.

In this embodiment the amount of residual carbon dioxide in the resulting liquid stream is reduced significantly and the subsequent dissociation section will therefore remove predominantly ammonia and only trace amounts of $CO_2$. The gas stream from the dissociation section may therefore be substantially $CO_2$ free and preferably is sent directly to the neutralization section. The advantage of this is that the low pressure gas stream (second gas stream) from the dissociation section need not be increased in pressure to be condensed in the medium pressure condensation section, and has already a suitable composition to be sent to the neutralization section. As known, a condensation section, to which different gas streams are supplied, needs to operate at the lowest pressure of all the supplied streams.

A further advantage of the use of an adiabatic flash is that the condensation section may also be operated at medium pressure (if the second gas stream is sent to the neutralization section) and that the heat of condensation may be recovered in the condenser. This recovered heat may be used in the urea concentration section, thereby reducing the energy consumption needed to concentrate the urea solution.

Alternatively, the gases from the dissociation section may be condensed in a condenser operating at low pressure forming a low pressure carbamate stream which can then be combined (after increase in pressure) with a carbamate stream in the medium pressure condenser.

After the dissociation section, the second urea solution is sent to the urea concentration section. The gases emitted from the urea concentration section are typically condensed and sent to a treatment section operating at low pressure (e.g. 4 bar) and the released vapor from this treatment section may be subsequently sent to either the condensation section or the neutralization section.

The advantages of the process of the invention are that the emission of $CO_2$ can be reduced by about 90% compared to the prior art process and that the plant capacity may be increased by at least 10% because more $CO_2$ may be reacted without having to increase the size of the $CO_2$ compressor. In this way, the high capital expenditure needed for $CO_2$ compression equipment is reduced.

Also, the invention allows to reduce or eliminate the negative environmental green gas problem and provides an environmentally friendly process to produce UAN. Besides creating an environmentally friendly UAN process, the energy consumption of the total UAN plant is reduced by at least 5%.

The present invention also provides a plant for the production of urea ammonium nitrate (UAN), comprising a urea synthesis section, a dissociation section and a urea concentration section in fluid communication with each other, and a neutralization and a mixing section for the production of UAN.

further comprising a medium pressure treatment section upstream of the dissociation section, said medium pressure treatment section comprising a decomposer and a condensation section, wherein the decomposer is in fluid communication with the condensation section so that the gases from the decomposer and optionally the dissociation section are sent to the condensation section, wherein the condensation section is in fluid communication with the urea synthesis section so that the carbamate solution formed in the condensation section is recycled to the urea synthesis section and the gases from the urea synthesis section are supplied to the condensation section, and wherein the condensation section is in fluid communication with the neutralization section so that the uncondensed gases are sent to the neutralization section to be reacted with nitric acid to form ammonium nitrate.

The principle of the present invention can also be used to revamp an existing UAN plant as to its design. Consequently, in another aspect, the invention provides a method of modifying an existing UAN plant. This method comprises providing a UAN plant comprising a urea synthesis section, a dissociation section and a urea concentration section in fluid communication with each other, and a neutralization and mixing section to produce UAN, wherein the UAN plant is modified by adding a medium pressure treatment section comprising a decomposer, preferably an adiabatic flash, and a condensation section, wherein the gases from the decomposer and from the urea synthesis section, are sent to one or more condensation sections, where they are partially condensed to form a carbamate solution, which is recycled to the urea synthesis section and wherein the remaining gases are sent to the neutralization section and reacted with nitric acid to form ammonium nitrate. The decomposer is in fluid communication with the urea synthesis section, and the condensation section is in fluid communication with the decomposer and the urea synthesis section. Under "fluid communication" it is understood a liquid or gaseous connection, which may comprise further equipment such as pumps or valves. One condensation section can be used if only medium pressure condensation is carried out. This is in case the low pressure gas stream from the dissociation section need not be condensed and is directly sent to the neutralization section. More condensation sections would be necessary if the low pressure gas stream from the dissociation section needs first to be condensed, which takes place in a low pressure condenser, which can be then followed by medium pressure condensation.

By revamping an existing UAN plant by the described design principle, the plant capacity can be increased by at least 10% without necessary investment costs for the existing large capital equipment such as $CO_2$ compressor or high-pressure synthesis equipment modifications.

Figure 2:
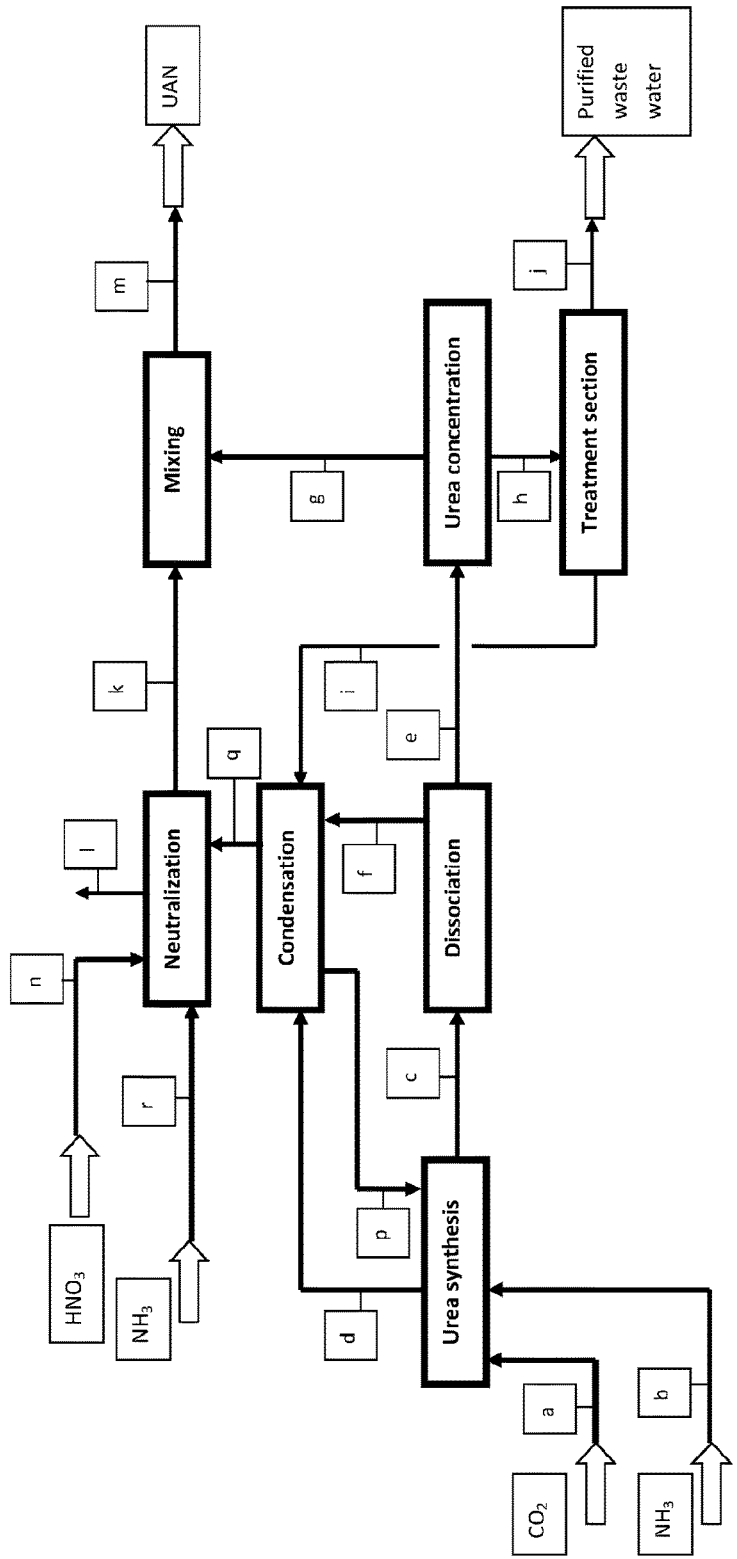
Figure 3:
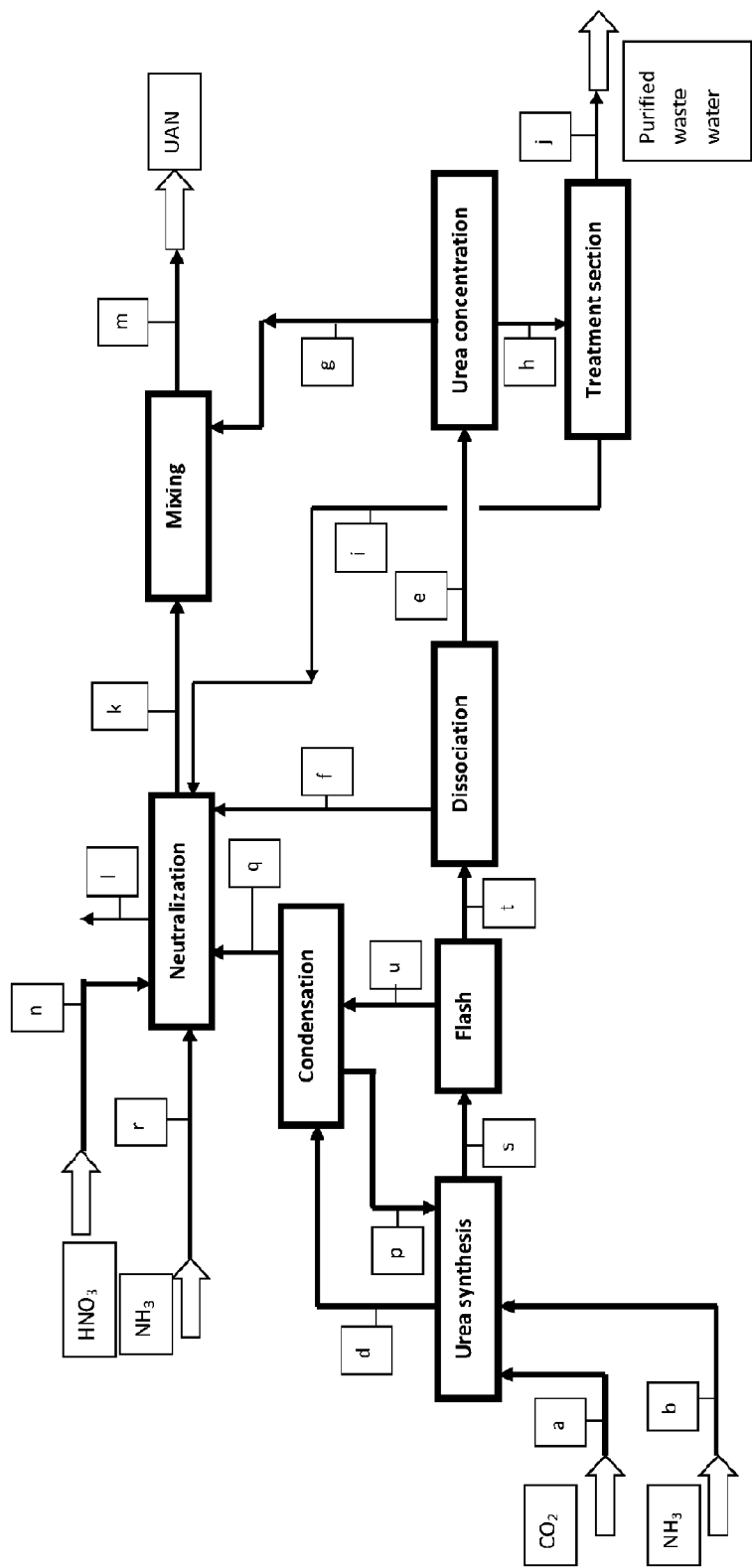

The invention is further illustrated based on the following non-limiting embodiments shown in FIGS. 1-3.

FIG. 1 shows a process scheme of a process known in the prior art. In this process, $CO_2$ (a) and $NH_3$ (b) are supplied to the urea synthesis section of a urea plant. The high pressure urea synthesis section typically comprises a urea synthesis reactor, a high pressure stripper and a high pressure condenser (not shown).

The overhead vapours of the urea reactor comprising inerts, carbon dioxide and ammonia are sent (d) to the neutralization section that is operated between atmospheric and 10 bar, and typically between 10 mm water column and 4 bar absolute.

The urea solution leaving the high-pressure stripper (c) is sent to the dissociation section. In this section the ammonia and carbon dioxide is separated from the urea water fraction by heating. The urea solution leaving the dissociation through (e) is further concentrated in the urea concentration section. The off-gases leaving the dissociation section and comprising ammonia and carbon dioxide, are sent (f) to said neutralization section as well.

In the neutralization section the off-gases of the urea plant are brought in contact with nitric acid supplied via (n). The formed aqueous ammonium nitrate leaving the neutralizer (k) is mixed with the formed urea solution (g) leaving the urea plant to form the urea ammonium nitrate (UAN) solution at the required and desired composition. The off-gas (l) leaving the neutralizer comprising inerts and carbon dioxide is sent after gaseous purification treatments into the atmosphere. The off-gases leaving the concentration section are condensed after which the formed condensate (h) comprising water, ammonia and $CO_2$ are treated in a treatment section to purify the process condensate (j). The released ammonia and $CO_2$ obtained by this water treatment (i) is sent directly to the neutralization section or is at first partially condensed after which the remaining vapour is sent to said neutralization section.

FIG. 2 shows a process scheme according to an embodiment of the present invention.

In contrast to the process in FIG. 1 now a low pressure condensation section is present between the dissociation and neutralization sections.

The first gas stream obtained from the urea synthesis section (d) is sent to the condensation section operating at low pressure. The second gas stream comprising water, ammonia and $CO_2$ obtained in the dissociation section (f) is also sent to the condensation section. The first and second gas streams are then partially condensed in the condensation section to form a liquid ammonium carbamate stream and an uncondensed ammonia comprising stream. The liquid ammonium carbamate stream is then recycled (p) to the high pressure urea synthesis reaction section, typically after increasing the pressure of the carbamate stream. The uncondensed stream (q) together with fresh ammonia (r) is sent to a neutralization section with nitric acid (n) to produce ammonium nitrate. The ammonium nitrate stream (k) is mixed with the concentrated urea solution in the mixing section, which results in a stream of UAN (m). Also in this embodiment the released vapour in the treatment section (i) can be sent to the neutralization section and preferably sent to this neutralization section after being condensed in the condensation section.

FIG. 3 shows another embodiment according to the present invention. In this embodiment, a medium pressure decomposer is present and the condensation section comprises a medium pressure condenser.

Particularly, the urea solution (s) leaving the stripper in the urea synthesis section is reduced in pressure to a medium pressure of 1-8 MPa. By this pressure reduction said urea solution is flashed whereby a concentrated, medium pressure urea solution is obtained. The released medium pressure gas stream (u) together with the carbon dioxide comprising gas stream (d) leaving the synthesis section is sent to a condensation section operating at a similar pressure as the pressure where the said flashing takes place. In the condensation section the exothermic carbamate formation takes place. The released condensation heat can be dissipated into cooling water or can be used to pre-concentrate the urea solution in order to save steam in the concentration section of the plant. The formed carbamate in the condensation section comprising at least one condenser is conveyed (p) to the urea synthesis section and preferably to the high-pressure carbamate condenser in this urea synthesis section.

The concentrated urea solution leaving the flash vessel at a pressure of 1-8 MPa is reduced further in pressure to about 0.2 and 0.6 MPa and supplied (t) to a dissociation section comprising at least one liquid/gas separator and a heater to purify the urea solution further. The second gas stream (f) from the dissociation section is low in carbon dioxide and contains ammonia and is sent either to the neutralization section (f) comprising a neutralizer, or can be condensed in a low pressure condensation section (not shown) to form carbamate that is recycled to the condensation section operating at medium pressure.

The urea solution leaving (e) the dissociation section is preferably but not necessarily at first subjected to flashing at about atmospheric pressure after which the urea solution is pre-concentrated by using the said condensation heat of said carbamate condensation. The urea solution can further be concentrated to the required concentration to be used for obtaining the required composition for the UAN fertilizer end solution product.

The ammonium nitrate is obtained by adding ammonia (preferably vaporized ammonia) feed together with nitric acid in the required ratio to the neutralizer in the neutralization section. The composition of the obtained ammonium nitrate can be pH controlled. In case ammonia containing waste streams are available in the urea plant, these waste streams can be sent to said neutralizer as well. The obtained ammonia nitrate in the neutralizer is mixed with the urea solution leaving the urea plant to obtain the required UAN fertilizer solution end product at its desired composition.

Since the carbon dioxide is substantially not emitted anymore in the vapour leaving the neutralization section, the amount of carbon dioxide to be supplied as feedstock to the synthesis section is decreased significantly and thus the amount of carbon dioxide to be compressed is decreased as well. This leads to a considerably energy reduction on the drive of that carbon dioxide compressor.

The invention claimed is:

1. Method for producing urea-ammonium nitrate (UAN), the method comprising:
   a) reacting $CO_2$ and ammonia under urea forming conditions in a high pressure urea synthesis section to produce a first urea solution comprising urea, water, ammonium carbamate and a first gas stream,
   b) subjecting said first urea solution to dissociation in a dissociation section thereby decomposing ammonium carbamate into a second gas stream and a second urea solution,
   c) subjecting the second urea solution obtained under b) to one or more concentration steps to produce a concentrated third urea solution,
   d) subjecting the first gas stream obtained under a) to partial condensation in at least one condensation section to form a liquid stream comprising ammonium carbamate, and a third gas stream,
   e) recycling the liquid stream comprising ammonium carbamate to the high pressure urea synthesis section,
   f) subjecting the third gas stream, optionally together with fresh ammonia, to neutralization with nitric acid in a neutralization section to produce an aqueous stream comprising ammonium nitrate, and
   g) combining said aqueous stream comprising ammonium nitrate produced under f) with said concentrated third urea solution produced under c) to produce UAN.

2. The method according to claim 1, wherein in step d) also the second gas stream obtained under b) is subjected to partial condensation in the at least one condensation section.

3. The method of claim 1, further comprising a medium pressure decomposition step carried out in a medium pressure decomposer between the urea synthesis section and the dissociation section, wherein the first urea solution is separated into a medium pressure liquid stream and a medium pressure gas stream, wherein the liquid stream is supplied to the dissociation section and the gas stream is supplied to the condensation section to be partially condensed and recycled to the urea synthesis section, while the uncondensed gases are supplied to the neutralization section.

4. The method of claim 3, wherein the second gas stream from the dissociation section is sent to the neutralization section.

5. The method of claim 3, wherein the medium pressure decomposer comprises an adiabatic flash.

6. The method according to claim 1, wherein carbon dioxide feed used in step (a) is subjected to a treatment to remove hydrogen contained therein.

7. The method according to claim 1, wherein said dissociation in step b) is carried out at 2-10 bar.

8. The method according to claim 1, wherein the third gas stream comprises at least 60 wt. % ammonia.

9. A plant for the production of urea ammonium nitrate (UAN), comprising a urea synthesis section, a dissociation section and a urea concentration section in fluid communication with each other, and a neutralization section and a mixing section for the production of UAN,
   further comprising a medium pressure treatment section upstream of the dissociation section, said medium pressure treatment section comprising a decomposer and a condensation section,
   wherein the decomposer is in fluid communication with the condensation section so that the gases from the decomposer are sent to the condensation section,
   wherein the condensation section is in fluid communication with the urea synthesis section so that the carbamate solution formed in the condensation section is recycled to the urea synthesis section and the gases from the urea synthesis section are supplied to the condensation section,
   wherein the condensation section is in fluid communication with the neutralization section so that uncondensed gases are sent to the neutralization section to be reacted with nitric acid to form ammonium nitrate,
   wherein the urea concentration section has an outlet for urea solution,
   wherein the neutralization section comprises an inlet connected with a nitric acid supply and comprises an outlet for aqueous ammonium nitrate connected with an inlet of the mixing section, and
   wherein the mixing section further comprises an inlet for urea solution connected with an outlet of the urea concentration section, and wherein the mixing section is configured for mixing the aqueous ammonium nitrate with urea solution to form urea ammonium nitrate and has an outlet for urea ammonium nitrate.

10. The plant according to claim 9, further comprising a flow line for gas from said urea synthesis section to said condensation section.

11. A method of modifying an existing UAN plant, the method comprising providing a UAN plant comprising a urea synthesis section, a dissociation section and a urea concentration section in fluid communication with each other, and a neutralization and mixing section to produce UAN, wherein the UAN plant is modified by adding a medium pressure treatment section comprising a decomposer and a condensation section between the synthesis section and the dissociation section, wherein the gases from the decomposer and the synthesis section are sent to one or more condensation sections where they are partially condensed to form a carbamate solution which is recycled to the urea synthesis section and wherein the remaining gases are sent to the neutralization section and reacted with nitric acid to form ammonium nitrate.

12. The method according to claim 11, wherein the method further comprises adding a flow line for gas from said urea synthesis section to said condensation section.

* * * * *